July 20, 1954  M. COZZOLI  2,684,218
AIRCRAFT CARGO HANDLING SYSTEM
Filed April 15, 1948  4 Sheets-Sheet 1

Michael Cozzoli
  *INVENTOR.*
BY James M. Clark
HIS PATENT ATTORNEY

Michael Cozzoli
*INVENTOR.*

BY James M. Clark

HIS PATENT ATTORNEY

July 20, 1954  M. COZZOLI  2,684,218
AIRCRAFT CARGO HANDLING SYSTEM
Filed April 15, 1948  4 Sheets-Sheet 3

Michael Cozzoli
*INVENTOR.*

BY *James M. Clark*

HIS PATENT ATTORNEY

July 20, 1954  M. COZZOLI  2,684,218
AIRCRAFT CARGO HANDLING SYSTEM
Filed April 15, 1948  4 Sheets-Sheet 4

Michael Cozzoli
*INVENTOR.*

BY *James H. Clark*

HIS PATENT ATTORNEY

Patented July 20, 1954

2,684,218

UNITED STATES PATENT OFFICE 2,684,218

AIRCRAFT CARGO HANDLING SYSTEM

Michael Cozzoli, Hagerstown, Md., assignor to Fairchild Engine and Airplane Corporation, a corporation of Maryland Application April 15, 1948, Serial No. 21,212

20 Claims. (Cl. 244—137)

The present invention relates to aerial delivery systems and more particularly to improvements in means for handling and releasing cargo and other items for aircraft.

In order to operate efficiently from high speed aircraft, it is extremely desirable that an aerial delivery system, must function rapidly and automatically to assure a closely grouped landing pattern of the objects which are dropped from the aircraft. This is essential in the peacetime handling and delivery of mail, express and other cargo items and it is particularly so in time of war when all types of material such as food, clothing, ammunition, guns, medical supplies, etc., as well as numbers of paratroopers, must be landed by parachute within a very small area.

Various methods have been proposed and used to drop containers or other objects from airplanes for commercial and military purposes, both with and without parachutes. This cargo discharge or release has been accomplished in the past by pushing objects through airplane doors, or through openings in the bottom of the aircraft, along rollers or upon endless belts on the aircraft floor, and in certain instances suspended from a monorail in which case the carriage has usually been ejected with the article which was dropped. The present invention is directed to improvements in the mechanism for handling and releasing containers or objects from relatively high-speed aircraft and accomplishes a very rapid release of a plurality of cargo items by completely automatic means which assures the items being dropped instantly upon manual release by the operator in a closely grouped landing pattern.

The present improved aerial delivery system includes essentially a monorail or track extending below the ceiling at the centerline of the cargo hold of the aircraft along which a series of trolleys are suspended on rollers and are actuated by an endless, electrically operated cable. This cable carries the trolleys and their load or cargo items to a tripping device directly over a hatch door in the belly of the fuselage, through which the cargo items are released. As each item falls from the airplane, its parachute is automatically opened and the cargo items are interconnected to cause them to fall closely together on the ground. The mechanism is operated by a push-button from one or more stations within the aircraft, which automatically opens the floor doors, unlocks the trolley lock system, starts the cable actuating motor and carries out the complete operation automatically. In an improved modification of the system disclosed herein, the monorail extends fore and aft of the hatch door, and automatic means are provided to lock the forward trolleys while those in the rear are carried to the point at which their loads are released, means for unlocking the forward trolleys and reversing the drive to move the forward trolleys rearward to the hatch door. When all of the cargo items have been released, the doors in the floor are automatically closed and the system is ready for reloading and a further delivery cycle.

It is, accordingly, a principal object of the present invention to provide means for the ejection and release of a plurality of cargo items or other objects, dropped at a very high speed, or in quick succession at a fraction of a second apart, such that they fall very closely together. It is a further object to provide power actuated means for moving and dropping such cargo items, objects and containers which are of a size and weight greater than can be handled manually. It is another object to provide means for the retention of the trolleys, carriages, rollers or other means used to move the cargo articles or objects within the fuselage of the airplane after the articles have been dropped. A further objective resides in the provision of means for automatically disconnecting each such article or object from its motive support, as well as the automatic disconnection of the motive support from its source of power.

A still further object of the invention is the provision of means for locking the cargo articles, or items, or their motive supports, in position in the airplane during taxiing, take-off, etc., before the articles are dropped, in order to eliminate the necessity of lashing and unlashing them or resorting to other manual operations. Another object of the invention is the provision of means for moving and dropping objects located in the airplane in order to enable freight and passengers to be carried normally without any special retracting, dismantling, or removal operation when the aerial delivery system is not in use and no objects are supported by it.

A still further object of the present invention is the provision of means for moving and dropping objects located in the airplane in order that personnel can make parachute jumps from the airplane and articles can be dropped substantially simultaneously for landing on the ground close together, without mutual interference within the airplane, on the way down, or upon the ground. Other objects and advantages both with respect to its general arrangement and in the details of its respective parts will become apparent to those skilled in the art upon reading the following description studied in conjunction with the accompanying drawings, forming a part hereof, in which:

Figures 1, 11:
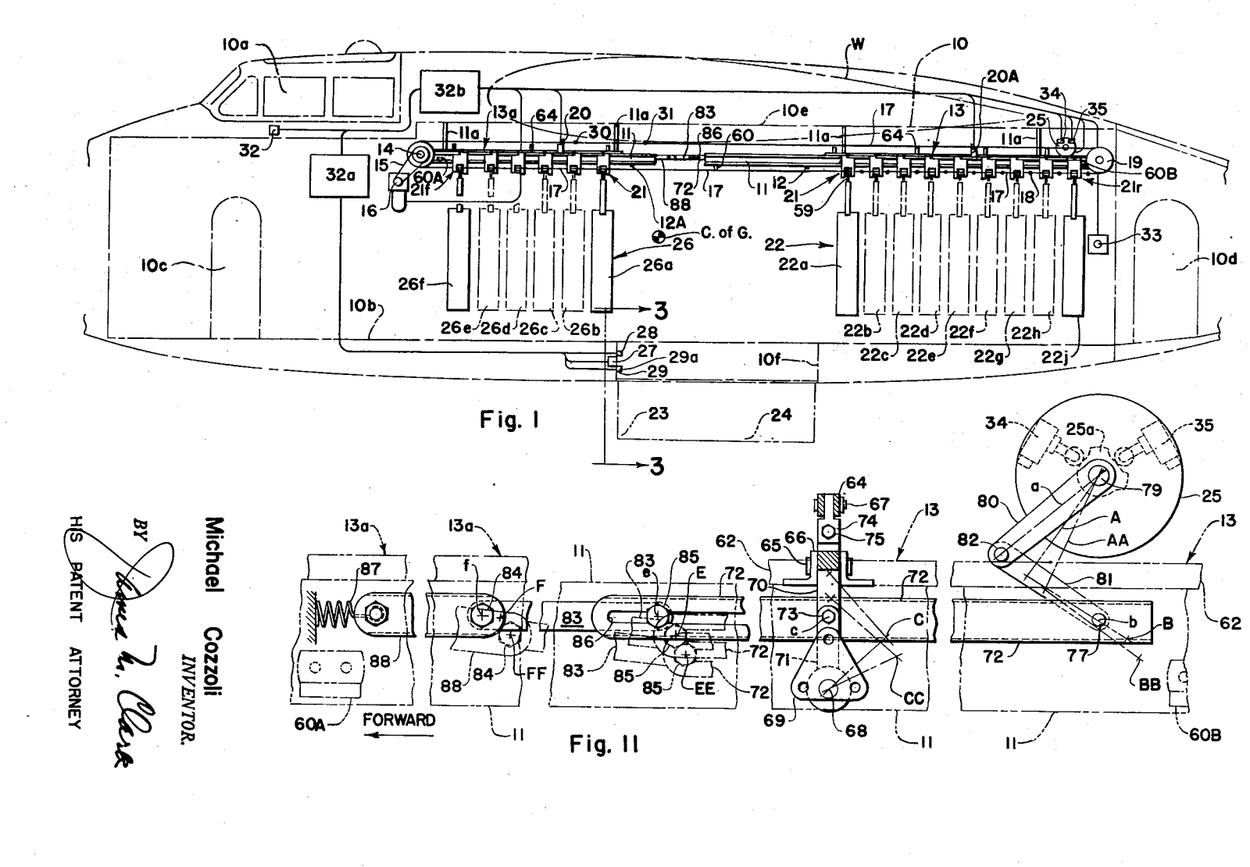
Fig. 1 is a side elevational view of the fuselage of an airplane equipped with a form of the improved aerial delivery system of the present invention.
Fig. 11 is an elevational view showing the locking mechanism and its actuating means.

Referring now to Fig. 1, the numeral 10 indicates the outline of the cargo hold of the fuselage of an airplane having a pilot control compartment 10a in the forward portion of the fuselage. The cargo hold is provided with a floor 10b, a forwardly disposed access door 10c, a door 10d in the aft portion and is roofed over by the ceiling construction 10e. The floor 10b is provided with an opening 10f through which the cargo items are adapted to be dropped.

The cargo items 22 which have been illustrated in Fig. 1 are parachute-equipped cylindrical containers or cans, which are generally referred to as paracans. In addition to their cargo contents, such as ammunition, food, or other items, these paracans contain a packed or stowed parachute which is automatically released as the paracan is dropped through the opening in the floor of the cargo hold. As each paracan falls from the airplane, its parachute is automatically opened by a rip chord attached to a static line in the ceiling of the cargo hold and the paracans or bundles are interconnected by a webbing tape of a fixed length which causes them to fall in a close pattern on the ground.

Extending longitudinally of the fuselage, there is provided a horizontally disposed continuous monorail beam or track 11, which may be of extruded aluminum, suitably suspended from the upper portion of the fuselage framework or ceiling by the structural suspension members 11a. At the forward end of the monorail 11, there is provided a drum 14 driven through the belt 15 by the reversible electric motor 16. A tail pulley or sheave 19 is located at the opposite or rear end of the monorail 11 and an endless cable 17 passes over this pulley 19 and runs to, and around, the drum 14 in a single continuous run. The endless cable 17 is preferably of flexible stranded steel construction and has swaged or otherwise fastened to it a plurality of steel balls 18, or other suitable protuberances, as indicated along the rear portion of the bottom run of the cable in Fig. 1.

Located upon the monorail 11 in the region of its mid-portion are two tripping elements 12 and 12A disposed in predetermined or optimum positions over the abovementioned opening 10f in the floor 10b of the cargo hold. The monorail 11 is centrally disposed over the floor opening 10f and both the monorail and the opening are preferably disposed along the longitudinal centerline of the fuselage, with the monorail extending fore and aft of the opening. Two power-operated hinged doors 23 and 24 are provided for closing the floor opening 10f when it is not in use. There is also disposed on the monorail 11, two limit switches 20 and 20A, the former being located in the rearward portion and the latter in the forward portion of the rail. The upper run of the cable 17 has attached to it two ball elements or other obstructions 30 and 31 which are adapted to operate the switches 20 and 20A to control the sequence of operation of the various elements of the delivery system as will be more fully explained.

At the aft end of the monorail 11, there is located a lock actuator motor 25, consisting of a reversible electric motor having reduction gears driving its output shaft at a very low speed. This lock actuator motor 25 is shown in greater detail in Fig. 11 and will be more fully described in connection therewith. For the present, however, it will be sufficient to state that one end of the actuator shaft is connected through suitable mechanical linkage to raise and lower the locking bars 13 and 13a which extend above the rearward and forward portions of the rail 11, respectively. The other end of the actuator shaft has fixedly mounted thereon the double cam element 25a which operates two limit switches 34 and 35. Within the pilot compartment 10a, there is provided a push-button starting switch 32 suitably connected to the electrical wiring within the junction boxes 32a which are connected to the remainder of the system, as well as to a second push-button starting switch 33 disposed at the aft portion of the monorail system, at what is known as the jumpmaster station. This permits the automatic operation of the aerial delivery system to be initiated by either the pilot at switch 32, or by the jumpmaster or other operator in the aft portion of the fuselage at the switch 33. Once either switch 32 or 33 is pushed by an operator, the system automatically follows through the entire sequence of operations, as will be hereinafter more fully explained.

Figure 3:
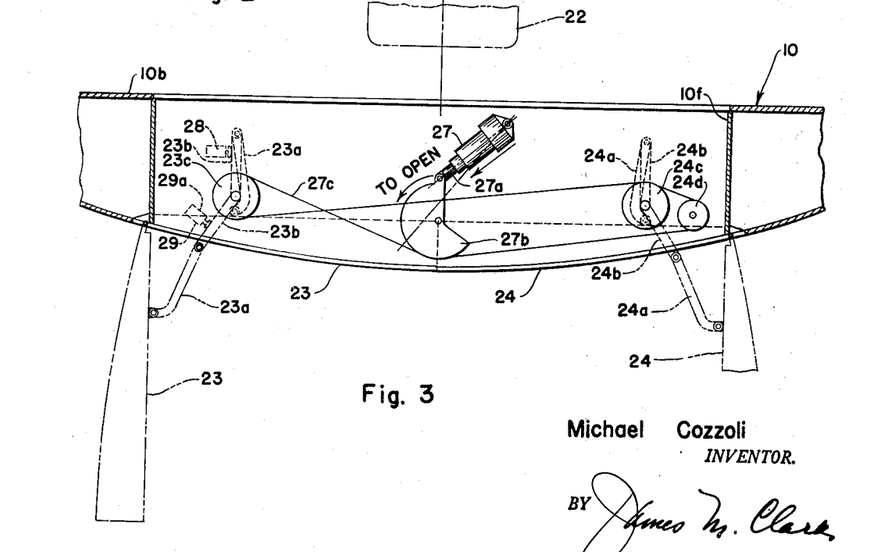
Fig. 3 is a sectional elevational view through the floor opening and doors therefor as taken along the lines 3—3 of Fig. 1.

When the push-button switch 32 within the pilot compartment 10a is pressed, or alternatively when the switch 33 in the aft portion of the fuselage is pressed, either switch serves to energize a door actuator motor 27 which is operatively arranged to open the cargo hatch doors 23 and 24. This door actuating mechanism is shown in Fig. 3 wherein the centrally located actuator motor has its extensor element 27a pivotally connected to a sheave quadrant 27b suitably locked to the flexible cable 27c. This cable extends around a drum type sheave 23c, connected by the links 23a and 23b to the hinged door 23, and the cable also extends to the opposite side of the opening to encircle a similar drum type sheave 24c operatively connected to the pivoted link elements 24a and 24b for actuation of the door 24, the cable also passing around an idler or take-up sheave 24d. From Fig. 3, it will also be noted that the doors 23 and 24 are hinged at the lateral sides of the opening 10f and that the paracans or cargo items 22, as well as the overhead monorail system from which they are supported are all centrally disposed in the lateral sense above the opening 10f.

The door actuator motor 27 is operatively connected through the cable 27c to each of the doors 23 and 24 such that they are simultaneously opened and closed. At either side of the opening, in the present case adjacent the door 23, there are provided switches 28, 29 and 29a which operate as the door 23 is opened or closed, by contact, or release from contact, with the door operating links 23b. When the doors 23 and 24 begin to open the switch 28, which is normally kept open by compact with the link 23b, is closed as the link moves away in a clockwise direction. The closing of switch 28 serves to ground, and thereby energize, a solenoid coil in the switch buttons 32 and 33, holding these switches in their closed positions without further manual attention from the crew or operator. As the doors open completely another pair of adjacent switches 29 and 29a are closed, and the closing of switch 29 serves to apply power to the locking actuator motor 25 mounted on top of the monorail 11 near its aft end. This actuator 25 rotates until the objects 22 on the rear portion of the monorail have been unlocked by the upward movement of the locking bar 13, at which time the switch 34 is operated by the cam 25a. The switch 34 is of the double throw type and its operation by cam 25a serves to cut off the current to the locking actuator motor 25 and applies power to the motor 16 which drives the conveyor cable 17 initially in a clockwise direction as viewed in Fig. 1. In this clockwise movement of the cable 17 in which the lower strand thereof moves forwardly, the ball elements 18 engage the respective carriages 21, which now being unlocked, are permitted to move forward and to be successively released as each carriage engages the rear trip 12, and the carbo items 22 are dropped successively through the opened doors 23 and 24. The detailed mechanism and operations of the trolleys or carriages 21 will be hereinafter more fully described in conjunction with Figs. 4 to 8 inclusive.

When each of the aft containers 22 (namely 22a to 22j inclusive) have been released from their respective trolleys and dropped through the floor opening 10f, the upper run of the cable 17 will have moved rearwardly such that the ball or projection 31 carried by the cable engages and operates the limit switch 20A over the rear portion of the rail. The switch 20A is a reversing switch of the double throw type and its engagement by the projection 31 as the latter moves rearwardly causes the switch to interrupt the circuits to the cable drive motor 16 and to energize the lock actuator motor 25 which rotates its shaft further in the same direction as previously, thereby causing the forward locking bar 13a to be raised to unlock the forward carriage 21f carrying the containers 26. As the actuator motor 25 continues to rotate, the cam 25a on its shaft closes the switch 35 as soon as the forward containers 26 have been unlocked by the bar 13a. This closing of the switch 35 serves to interrupt the current to the actuator motor 25, which stops rotating and applies power to the opposite fields of the reversible cable drive motor 16. The latter then rotates in the opposite direction causing the cables 17 to move counter-clockwise, with the lower run of the cables moving rearwardly. As will hereinafter be more fully explained in connection with the trolley details and their operation, the rear trailing trolleys 21r stop moving forward when the foremost of the rear trolleys (carrying container 22a) engages the stop member 60, with the remaining trolleys closely following up behind this leading trolley. The ball elements 18, however, are released from the rear train of trolleys, as will be more fully explained, and move forward to positions wherein they engage the front trolleys 21f. As the motor 16 is reversed however, by the closing of switch 35, and the lower run of the cable 17 moves rearwardly, the ball elements 18 engage the respective front trolleys 21f and carry the same rearwardly with their respective suspended loads 26a to 26f, inclusive, and as each trolley engages the forward trip elements 12A the forward cargo items are successively released and dropped through the opening 10f in the fuselage floor. As the leading trolley (carrying container 26a) moves rearwardly, this trolley is actually the rearmost of the front group of trolleys; and after it has been relieved of its load 26a the cable 17 is permitted to pass rearwardly therethrough and the carriage moves rearwardly until its rearward movement is limited by the trolley 21r at which the following trolleys accumulate behind this leading trolley as they release their respective loads.

When all of the forward containers or cargo items, 26a to 26f inclusive, have been dropped, and the ball elements 18 have been returned to their original positions beneath the rear portion of the monorail, as they appear in Fig. 1, ready for another operational cycle, the ball or projection 30 on the upper loop or run of the cable 17 engages the limit switch 26. This interrupts the power to the cable drive motor 16 and applies power simultaneously to the reverse fields of the lock actuator motor 25, as well as the motor 27 for the doors 23 and 24, causing the actuator motor shaft to rotate in the reversed direction imparting downward locking movement to the locking bars 13 and 13a to their respective locking positions. At the same time, the motor 27 closes the doors 23 and 24, and when the doors have been closed completely, the switch 28 is again opened by engagement by the link 23b, which serves to open the holding coil or solenoid circuit previously referred to, and allows the push button 32, or 33, whichever initiated the operation, to snap open and to thereby ready the electrical system for a succeeding operation.

Figs 4 to 8 inclusive, show the details of the leading carriage or trolley 21r which is the front trolley of the rear group, or the trolley which supports the forward paracan or cargo item 22a. While this is a typical trolley and it differs only from the remaining trolleys in the rear group in that it has a bumper or projection 61 which engages the limit stop 60, being the only carriage which engages this stop, it is otherwise identical in all respects with the remaining rear trolleys. This leading trolley of the rear group will be referred to as a righthand trolley, inasmuch as the rail is disposed generally on the righthand side of this and the other rear group trolleys as they move forward into their cargo releasing positions. The trolleys 21 on the other hand may be referred to as lefthand or opposite hand trolleys, being opposite to those trolleys 21r in the rear group. These forward trolleys 21f engage the monorails from their lefthand sides looking in the direction in which they move to release their cargo items 26. Except for the sequence and the direction in which they operate and move, and their symmetrically opposite construction, the front and rear trolleys are otherwise substantially identical and operate in a similar manner.

Figure 4:
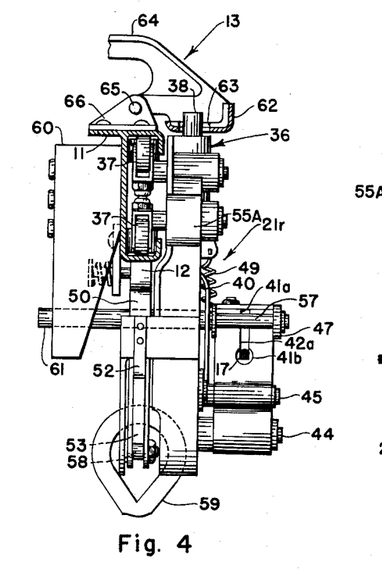
Fig. 4 is a cross-sectional view of the monorail showing a front view of one of the cargo carrying trolleys.
Figure 5:
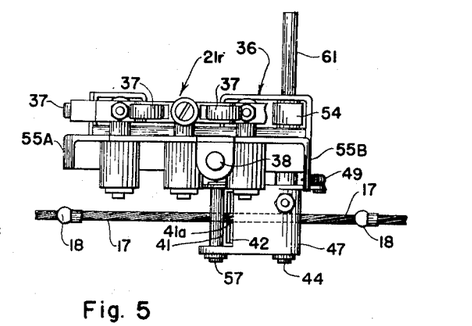
Fig. 5 is a plan view of the same trolley with the monorail omitted.

In Fig. 4 there is shown the forward or leading trolley 21r of the rear group as viewed looking rearwardly, locked in place on the rail 11 by the overhead locking bar assembly 13, with the fitting 59 supporting the forward container, and ready for the first of the sequence of operations. The trolley is composed essentially of a frame 36 which may be a casting, forging or welded structure; a plurality of rail-engaging rollers 37; and a vertically movable locking plunger 38 as shown in the elevational view in Fig. 6 of the carriage in its unlocked and tripped condition, in which the carriage has just been disconnected from the operating cable and is still moving along the monorail. The looking plunger 38 is normally urged downwardly by the compression spring 39 to its unlocking position. A link 40 having one end pivotally attached at the point 46 to the plunger 38 has its other terminal pivotally attached at the point 45 to a lever 41, which in turn is pivotally mounted on the frame 36 at the pivot 44. The lever 41 is provided with a slot 41a in its forward surface, this slot being parallel sided and of slightly greater width than the diameter of the cable 17 and terminates at its lower end in a circular hole 41b which is of sufficient diameter to allow the ball 18 to pass therethrough. The slots 41a and 41b form an inverted keyhole in the lever 41 with the slot 41a extending through to the outer edge of the lever 41 opposite its pivot 44, in order that the cable 17 which passes through the lower part of the inverted keyhole slot in Fig. 4 when the lever 41 is in its normal vertical position, may pass through the open end of the slot 41a as the lever 41 is caused to rotate downwardly into the position shown in Fig. 6. There is mounted on the lever 41 a plate 42 pivotally mounted at 56 and continually urged by the coil springs 43 on the pivot bolt 56 to lie against the rear face of the lever 41. The plate 42 also has a slot 42a, of the same width as the slot 41a in the lever 41, and is arranged in such manner that when the front surface of the plate 42 and the rear surface of the lever 41 are touching or in contact, these two slots are in exact alignment. In this position these slots permit the cable to pass through in either direction, but these slots serve to obstruct the ball in moving from the rear to the front, or from the right to the left in Fig. 6. The slots, however, also permit the cable and ball elements to pass from front to rear, or left to right in Fig. 6, by deflection of the plate 42.

Figure 7:
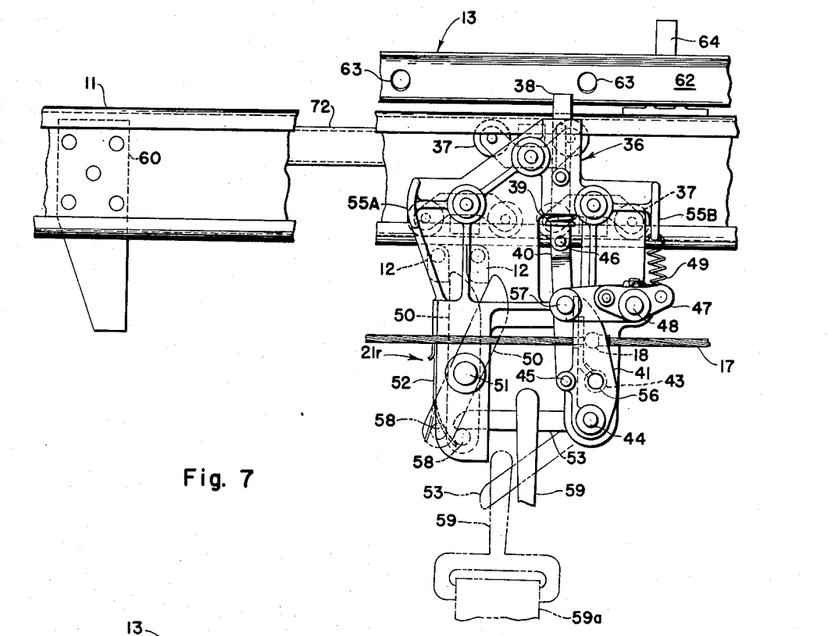
Fig. 7 is a similar view of the same monorail and trolley with certain of its parts moved into a still further operating position.
Figure 8:
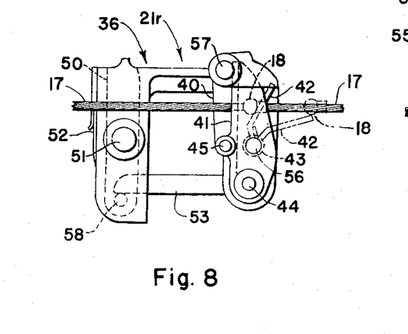
Fig. 8 is an elevational view of the lower portion of the trolley shown in Fig. 7, showing two operative positions of the cable releasing mechanism.

As may be more particularly seen in Fig. 8, the selective latching or unlatching on the part of the levers 41 and 42 is accounted for by the fact that the ball elements 18 can pass readily through the circular slots 41b in the plate of the lever 41 but this ball cannot pass through the narrow slots 42a in the plate 42. Since the plate 42, however, can be rotated clockwise against the pressure of the coil springs 43, as in Fig. 8, the ball in moving from left to right readily passes through the round hole 41b in the plate of lever 41 and when the ball engages the face of the plate 42 it causes the latter to rotate clockwise against the coil spring and to ride up the face of the plate with the cables passing through and out over the free end of the downwardly deflected plate 42. When moving in the opposite direction, however, the plate 42 which is held against the rear face of the lever 41, cannot be rotated to permit this disengagement of the cables, and in forward movements of the cable the rear carriages or trolleys 21r are carried forwardly with the cable by virtue of the motive forces transmitted thereto by the ball elements 18 against the rear of the plate 42. The lever 41 is normally held in its vertical position as shown in Fig. 7 by bearing against the bolt 57 of a substantially U-shaped lever 47 which is pivotally mounted upon the frame 36 of the trolley by means of the pivot bolt 48 and is normally held in a substantially horizontal position by the upwardly extending tension spring 49.

On the lower end of the trolley frame 36 there is disposed a load supporting lever 53 pivotally mounted at 44 and with its respective load item 22 held by the fitting 59 and the strap 59a, it is supported in a substantially horizontal position by bearing against the transverse bolt 58 of a normally vertical lever 50, which in turn is pivotally mounted upon the frame 36 at the pivot 51. A leaf spring 52 bears against the bolt 58 to continually urge the lever 50 into its normal vertical position.

As explained above, when the lock actuator motor 25 is initially energized, the rear trolleys 21r are unlatched by the locking mechanism 13 and these trolleys are then free to roll in either direction as limited by the ball elements 18, along the rails 11. As the cable drive motor 16 causes the cable 17 to move forward, the swaged ball 18 engages the plate 42 as shown in Fig. 7, and the trolley 21r together with its container 22 is moved forward until the tripper mechanism 12 disposed beneath the rail 11 is contacted by the upper end of the lever 50. The trip 12, as well as its counterpart 12A, is pivoted, spring-loaded and equipped with a stop to permit rotation in the counter-clockwise direction only as viewed in Fig. 7. The tripper 12 is also shown in the end elevation in Fig. 4 and when engaged by the lever 50 it causes the latter to rotate about its pivot 51 to the position shown in Fig. 7, in which the bolt 58 at its lower end is moved forward sufficiently to free the arm 53 permitting the load and its supporting fitting 59 to slide forwardly over the end thereof. Due to the location of the trip 12 above the aft portion of the opening 10f in the fuselage floor, as the arm 53 is released and swings downwardly under the load of the container 22 the inertia of the latter, as it moves forwardly, causes it to drop downwardly through the central portion of the opening 10f.

Figure 6:
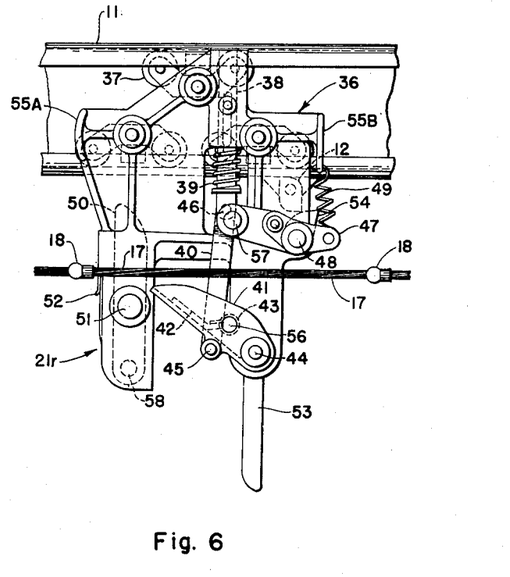
Fig. 6 is a side elevational view of the monorail and trolley of Figs. 4 and 5, with certain of its parts actuated into one of its operating positions.
Figure 9:
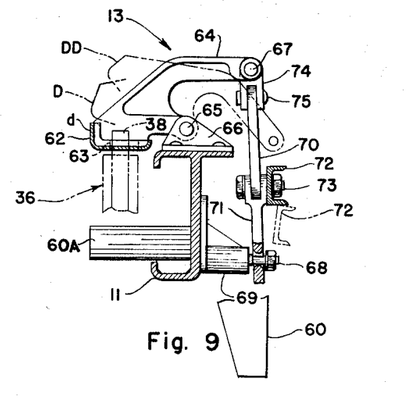
Fig. 9 is a cross-sectional view of the monorail showing the mechanism for locking the trolley to the rail.

Fig. 6 shows the trolley 21r being disengaged from the cable 17 as the trip 12 is passed by the previously deflected lever 50, which has been returned to its normal vertical position by the leaf spring 52, and subsequently engages the pawl 54. The latter is pivotally mounted upon the trolley frame on the pivot 48 to move with the U-shaped lever 47 and urges the latter to rotate in the clockwise direction about the pivot 48, lifting the pin 57 at its forward end from contact with the lever 41. The latter is then permitted to be pushed downwardly under the action of the compression spring 39 acting through the link 40. The lever 41 is accordingly forced to rotate downwardly about its axis 44 and the trolley, accordingly, becomes disengaged from the cable 17, which is permitted to continue in its forward power-driven movement while the trolley rolls under its own inertia until it engages the limit abutment or stop 60 attached to the back of the monorail 11, as shown in Figs. 4, 7 and 9. This stop 60 interferes with only the extended pin 61 of the leading or first trolley of the rear set and the front trolleys 21f, not having extended pins like 61, can pass by this stop without interference. End limit stops 60A and 60B are attached at the front and rear ends respectively of the rail as shown in Figs. 1 and 9, being engaged by the ends 55A and 55B of the respective trolley frames. As indicated above, the trips 12 and 12A are permitted to rotate in one direction only, their pivotal mounting and spring loading being shown in Fig. 4, as well as in elevation in Figures 6 and 7. This is done to permit the rear trolleys, when loaded, to be moved manually rearward, and to move the front trolleys forward to various positions.

Figure 10:
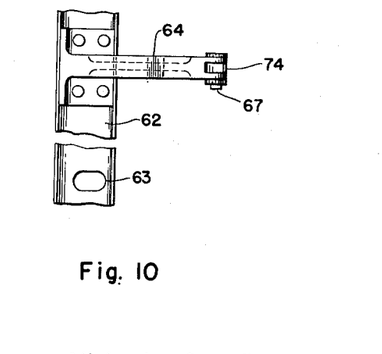
Fig. 10 is a top plan view of a hinge member and a portion of the locking bar.

Referring now more particularly to Figs. 9, 10 and 11, there is shown a preferred embodiment of the automatic locking system 13. The latter, as indicated above, is divided into two similar portions 13 and 13a, disposed above the rear and forward portions of the rail means respectively, and each portion consists essentially of a longitudinal channel member 62 having a plurality of elliptical holes 63 therein, as shown in Figs. 4, 7, 9 and 10. The member 62 is rigidly attached to a plurality of hinged members 64 which are pivotally attached at the pivots 65 to the brackets 66, which are in turn fixedly attached to the top flange of the supporting rail 11 at spaced intervals. The hinge or lever 64 is pivotally connected at 67 to a universal joint or fitting 74 which supports a pivot bolt 75 from which extends a two-part link member 70 and 71. The latter are intermediately pivoted at 73 both to each other and to a longitudinally extending channel member 72. This member 72, as more particularly shown in Fig. 11, is pivotally connected at its rear terminal at the pivot 77 to a link 81 which in turn is pivotally connected by the pivot 82 to a bellcrank or lever 80 which is fixedly attached to the shaft 79 of the lock actuator motor 25. The lower link member 71 is secured to a fitting 69 pivotally mounted at 68 upon the rail 11.

In operation, the locking actuator 25 rotates the linkage 80—81 downwardly and rearwardly, in the counter-clockwise direction of the actuator shaft 79 in Fig. 11, causing the lever 80 to be moved from position a to position A, and the longitudinal member 72 moved rearwardly and downwardly such that its pivotal connection 77 moves from b to the position B. The pivot point 73 on the link 70 will then be caused to be moved from c to point C to thereby exert a downward pull on the lever 64 at the pivot 67 causing the channel 62 to be lifted from position d to position D in Fig. 9, moving out of engagement with the trolley lock pins 38, thereby unlocking all of the rear trolleys 21r. As indicated above, it is necessary to maintain the forward trolleys 21f in their locked positions while the rear trolleys are moved forward and their loads released. After the rear trolleys have released their loads and the obstruction 31 as shown in Fig. 1, on the upper run of the cable 17 has engaged and operated the limit switch 20A to stop the drive motor 16, the actuator motor 25 is again energized and rotates to position AA shown in Fig. 11 to unlock the forward trolleys. This is accomplished by a lost-motion means represented by a slotted terminal 86 at the forward end of the channel member 72 and connecting with a link 83 between that member and the forward channel member 88. Fig. 11 illustrates the manner in which this delayed or lost-motion feature operates, wherein the first move of the lock actuator 25 and arm 80 to its position A in this figure allows the rear trolleys to be unlocked but does not unlock the forward trolleys. The member 72 is joined at its forward end to the forward member 88, which is similar to the member 72, by a link 83 attached by the bolt 84 to the forward member 88, and by a bolt 85 slidable in the slot 86, to the rear member 72. As indicated in the general arrangement view in Fig. 1, the present lost-motion joint may be located at substantially the mid-point of the supporting rail 11, but in any case it is preferably disposed between the forward group of trolleys and the rear group of trolleys.

When the locking actuator 25 and arm 80 make the first move to the position A in Fig. 11, and the member 72 moves rearward to unlock the rear trolleys, the front edge of 72 moves from point e to the point E. Since the bolt 85 slides in the slot 86, the link 83 does not move the forward member 88. Accordingly this lost-motion device does not permit the initial move of the actuator to unlock the forward trolleys, and the bolt 84 initially at f moves slightly to the point F corresponding to positions A, B, C, D and E, the link 83 merely rotating about the fixed pivots f and F, but not moving sufficiently to unlock 13a. However, when the second movement of the locking actuator takes place, that is, to the point AA, the member 72 moves rearward and the bolt 85, engaged by the slot end 86 is moved to the rear, pulling the link 83, together with the forward member 88, rearwardly, thereby unlocking the forward trolleys in the same manner as the rear trolleys were unlocked. When this occurs, the respective positions AA, BB, CC, DD, EE and FF are reached. As the actuator 25 moves the member 72 forward to lock the trolleys, the tension spring 87 assists in urging the member 88 forwardly to its initial locked position, and the reverse of the foregoing operation takes place.

Figure 2:
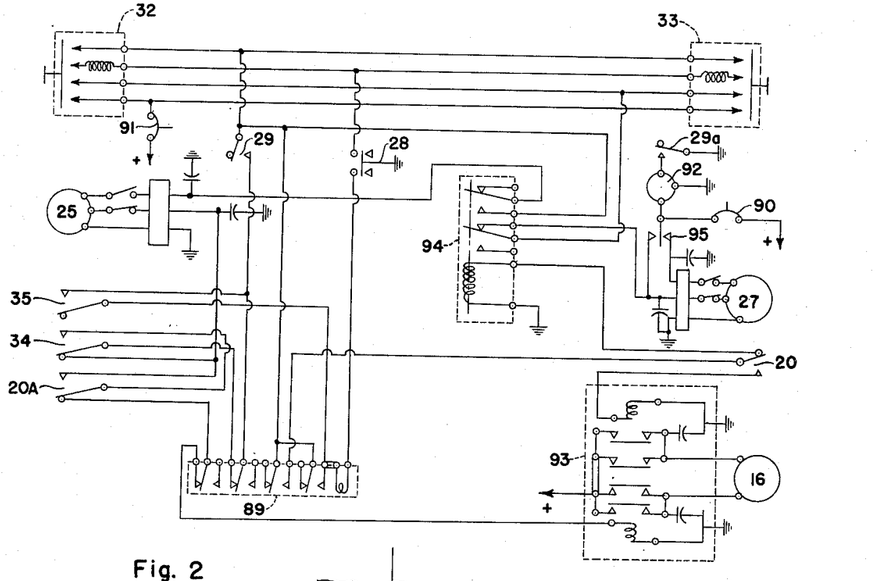
Fig. 2 is a schematic electrical wiring diagram of the major operating circuits of the improved system.

As indicated above, Fig. 2 shows a schematic wiring diagram of the electrical circuit by which the above described operations are obtained. In this figure, the starting push-buttons are indicated by the numerals 32 and 33, the salvo control relay 89, the salvo circuit-breaker at 91, and the locking actuator motor by the numeral 25, with its control switches 35, 34, and limit switch 20A. The numeral 16 represents the reversible cable drive motor controlled by the adjacent relay 93 and the double-throw limit switch 20. The door actuating motor is indicated by the numeral 27 and its relay by the numeral 94, a door control switch being indicated at 95 and a door indicating lamp at 92. The door motor circuit-breaker is shown at 90 and the door limit switches indicated by the numerals 28 and 29, the former serving to energize the holding or solenoid coils in the starting buttons 32 and 33. As indicated above, the electrical system is such that once it is manually started, the complete operating cycle is automatically carried out and when all the loads are released the system is restored to its initial starting condition ready for the following operational cycle.

Referring again to Fig. 1, it should be noted that the main sustaining surface W passes transversely through the upper portion of the fuselage 10 to which it is structurally attached for the aerodynamic support of the aircraft and its load during flight. The wing W is disposed in the upper portion of the cargo space such that the opening 10f in the bottom of the cargo space is disposed substantially beneath the midportion of the wing, as measured both spanwise and chordwise. In this figure, there has also been indicated the center of gravity, as marked by the letters C. of G., which, in the loaded condition of the particular aircraft indicated in the drawings, is disposed at about 28% of the wing chord. With the C. of G. disposed at a position above the cargo hatch 10f, between the transverse vertical planes defined by the front and rear edges of the hatch opening, and with the cargo loads divided into groups disposed both fore and aft of this C. of G., a desirable arrangement is obtained which imparts a minimum disturbance to the longitudinal trim of the airplane during flight by the rapid release of these disposable loads.

There has, accordingly, been disposed above a unique aerial delivery system which is fast, efficient, quick to load, and easy to operate. A prototype of the disclosed automatic monorail system incorporated in an actual full-scale airplane has proved capable of releasing fifteen standard three-hundred and fifty (350) pound Army paracans in approximately eight seconds, and operation of the system has indicated that a greater number of even heavier items can be released in less time. This has also been accomplished with an accompanying mass jump of paratroopers and a minimum disturbance to the trim of the airplane. As indicated above, the system may also be operated from the pilot's overhead panel as well as from the jumpmaster's station, or in emergencies it can be controlled manually. Red and green signal lights, operated from the pilot's compartment are preferably installed on the jumpmaster's panel, the red light indicating the approach to the target and is followed by the green light when the target has been reached. In actual tests, the present delivery system has permitted an airplane of the type and size shown in Fig. 1, to drop, in a single operation, thousands of pounds of supplies and equipment, plus its normal complement of forty-two paratroopers within a relatively small area upon the ground.

It will be apparent to those skilled in the art that in its simplest form the present invention would comprise a single track or guide means and a single set of load-carrying units extending across an opening through the bottom of the airplane, and in which the conveyor system might move the objects to be dropped in one direction only. The improved form of the present invention as described above, provides for automatically moving the objects in opposite directions toward an opening in the central portion of the cargo space, automatically releasing their supports from the source of motive power and dropping them through the opening, as well as locking them in position when the system is not in use. In other forms of this invention either group of trolleys may be discharged first, the track or guide means may be of other construction than the monorail shown and the cable may take the form of any flexible or rigid reversibly driven member carrying suitable trolley engaging means. It will also be obvious to those skilled in the art that a plurality of such conveyor systems can be installed within the same aircraft cargo hold, preferably in side-by-side or parallel relationship, but, could of course, be disposed at other angles as the circumstances of the particular installation might dictate.

Other forms and modifications of the present invention both with respect to the general arrangement of its essential units within the aircraft and the details of its respective parts, are intended to come within the scope and spirit of the present invention, as more particularly defined in the appended claims.

I claim:

1. In an aircraft load handling system, a cargo space having an opening through the lower portion thereof, rail means extending longitudinally of said cargo space across said opening from a position aft to a position forward of said opening, load-carrying units having rolling engagement with said rail means, movable means arranged to be power-driven adjacent to and in either the fore and aft direction of said rail means, engaging means associated with said movable means for moving said load-carrying units from said fore and aft rail means portions to positions above said opening and means for individually releasing the loads from said units during flight as each unit is moved by said movable means to a predetermined position above said opening.

2. In an aerial delivery system a cargo space having an opening in the floor thereof, a longitudinally disposed overhead supporting rail extending across said floor opening, a reversible electric motor, a cable drum operatively connected to said motor disposed at a first end of said rail, a cable sheave disposed at the opposite end of said rail, a cable engaging said drum and said sheave arranged to be moved along said rail by said electric motor, a plurality of load-carrying trolleys movably supported on said rail, a plurality of obstructions carried by said cable, engaging means on said trolleys arranged to contact said cable obstructions for moving said trolleys along said rail and locking means on said rail arranged to lock and unlock said trolleys at predetermined intervals.

3. An aerial delivery system for a cargo space having an opening in the floor thereof, a longitudinally disposed overhead supporting rail extending across said floor opening, a first set of load-carrying trolleys movably mounted on said rail one behind the other at one end of said rail, a second set of load-carrying trolleys movably mounted on said rail at the opposite end thereof, power means arranged for moving said first set of trolleys to the central portion of said rail above said floor opening, means for releasing said load from said trolleys at said central rail portion for dropping the same through said floor opening, said power means arranged to move said second set of trolleys to said central rail portion automatically after the loads have been released from said first set of trolleys and further means arranged to release the loads of said second set of trolleys at said central portion of said rail to drop through said floor opening.

4. An aerial delivery system for a cargo space, a cargo opening through the bottom of said cargo space, door means for said cargo opening, rail means supported within said cargo space extending from a storage position therein to a releasing position above said cargo opening, a plurality of load-carrying units translatable along said track means, means for locking said load-carrying units to said track means, power-driven means engageable with said load-carrying units for translation thereof from their said storage to releasing positions, trip means initiated by said load-carrying units reaching predetermined positions arranged for the release of their respective loads through said cargo opening and electrical means for the automatic unlocking of said load-carrying units initiated by the opening of said door means and the subsequent automatic movement of said power means for the transport of said load-carrying units to their releasing positions.

5. In an aerial delivery system; a cargo space; an opening through the lower portion of said cargo space; track means extending across said opening from stowed positions within said cargo space to releasing positions above said opening; load-carrying units translatable along said track means; said load-carrying units divided into groups of units disposed within said stowed positions on opposite sides of said opening; power-driven means selectively engageable with said load-carrying units for movement of said units from their stowed to their releasing positions above said opening; door means for closing said opening; actuating mechanism for the operation of said door means; limit means disposed at predetermined positions with respect to said track means; trip means disposed at predetermined positions with respect to said track means; electrical means initiated by the opening of said door means for the unlocking of a first group of said cargo-carrying units, the powered actuation of said power-driven means and the movement of said first group of cargo-carrying units from their stowed to their releasing positions determined by said trip means; automatic means associated with said power-driven means initiated by its reaching a predetermined position with respect to said limit means for the interruption of said power-driven means and the unlocking of said second group of cargo-carrying units; completion of said unlocking operation initiating movement of said power-driven means in the reverse direction for the automatic movement of said second group of load-carrying units from its stowed position on the opposite side of said opening to its releasing position above said opening and the release of its cargo items therethrough upon engagement with said trip means.

6. In an aircraft having a fuselage, a cargo space in said fuselage, a transversely disposed wing for the support of said fuselage, the midportion of said wing disposed above said cargo space, and a cargo hatch opening from said cargo space extending through the bottom of said fuselage disposed beneath the midportion of said wing, load supporting and releasing apparatus disposed with respect to said cargo space in such manner that a plurality of loads are initially supported within said cargo space both fore and aft of said cargo hatch opening and automatic means including a continuous power-driven reversible cable for the successive release of said loads through said opening with a minimum disturbance to the longitudinal trim of the aircraft.

7. In an aircraft having a longitudinally disposed fuselage containing a cargo space, a transverse wing for the aerodynamic support of said fuselage, and a cargo hatch opening in the floor of said fuselage disposed beneath said transverse wing, aerial delivery means for releasably supporting load groups within said cargo space in a suspended arrangement both fore and aft of said cargo hatch opening such that the center of gravity of the aircraft is disposed beneath said transverse wing, said center of gravity disposed above said floor opening and between said fore and aft disposed load groups, and means including tripper elements for automatically releasing said load groups through said cargo hatch opening during flight.

8. In an aircraft having a fuselage, a cargo space within said fuselage, a cargo hatch opening in the floor of said fuselage beneath said cargo space, and a wing extending transversely across and above said cargo space and above said hatch opening for the aerodynamic support of the aircraft, an unloading system including a load supporting conveyor disposed within said cargo space arranged for conveying longitudinally spaced loads from positions fore and aft of said cargo hatch opening to positions above said cargo hatch opening, power means for driving said conveyor, trip means carried by said conveyor for the automatic release of said loads during flight through said cargo hatch opening from positions beneath said transverse wing, and means for reversing the direction of said power means upon said conveyor reaching a predetermined position.

9. An aerial delivery system including a track, a plurality of trolleys movably mounted along said track, a first set of said trolleys supported at an end of said track, a second set of said trolleys supported at the other end of said track, locking means for simultaneously locking both sets of said trolleys with respect to said track, lost-motion mechanism forming part of said locking means arranged in an initial position of said locking means to maintain the locked condition of said second set of trolleys while unlocking said first set of trolleys with respect to said track, said locking means in a further position arranged for automatically unlocking said second set of trolleys while said first set of trolleys remains unlocked.

10. In a conveyor system, a guide rail, a load-carrying trolley rollingly engageable with said guide rail for movement therealong, propelling means extending substantially parallel with said guide rail, slotted means carried by said trolley for engagement by said propelling means for moving said trolley along said guide track in a first direction, and trip means operable for the release of said propelling means from said slotted means upon said trolley reaching a predetermined position with respect to said guide track, said propelling means having an obstruction portion of a size too large to pass through said slotted means in its operative position, said slotted means being resiliently mounted and capable of being deflected by said obstruction portion to permit overrunning of said propelling means with respect to said trolley when said propelling means is moved in a direction opposite to said first direction.

11. In a load releasing system for aircraft, an elongated supporting member, a plurality of load supporting carriages arranged for movement along said supporting member, a driven member movably supported adjacent said supporting member, said driven member having a series of spaced protruding portions selectively engageable with corresponding carriages, power means for driving said driven member and its protruding portions for pushing said carriages along said supporting member, stop means carried by said supporting member for preventing said carriages from running off either end of said supporting member, trip means for releasing the load from the respective carriage as it passes said trip means and limit means actuated by said driven member for shutting off said power means when said driven member has been moved a predetermined distance.

12. In a cargo conveying and releasing system for aircraft having a cargo space, the center of gravity of the aircraft being disposed within said cargo space, a longitudinal track extending fore and aft of said center of gravity, a first set of loaded carriages supported in a stowed position upon said track aft of the center of gravity, a second set of loaded carriages supported in a stowed position upon said track forward of the center of gravity, power means for propelling said first set of loaded carriages forwardly from their stowed positions, means cooperatively carried by said track and each of said carriages in said first set for the automatic release of the load from each of said carriages at positions closer to the center of gravity than their stowed positions, said means effecting release of said carriages from said power-driven propelling means, reversing means actuatable upon said power-driven propelling means moving forwardly a predetermined distance for causing said propelling means to be reversed to move rearwardly and to propel said second set of loaded carriages rearwardly therewith and automatic means for the release of the loads from said second set of carriages at positions closer to the center of gravity than their stowed positions.

13. In an airplane having a fuselage, a cargo space within said fuselage, a cargo hatch in the floor of said cargo space, a closure for said cargo hatch and a wing extending transversely across said cargo space and said cargo hatch, a load supporting and releasing system disposed within said cargo space including means for stowing a load in a position within said cargo space away from said cargo hatch, propelling means initiated by the opening of said closure for conveying said load to a position above said cargo hatch and automatic means for releasing said load at a predetermined position above said cargo hatch for its dropping therethrough during flight.

14. In an airplane having a cargo compartment, a cargo hatch in the floor of said cargo compartment, and a closure for said cargo hatch, load-carrying means disposed within said cargo compartment including means for stowing a load in a position within said cargo compartment spaced from said cargo hatch, power means for driving said load-carrying means, and further means initiated by the opening of said closure for starting said power driving means for carrying said load to a position above said cargo hatch, and automatic means for releasing said load at a predetermined position above said cargo hatch for its dropping therethrough.

15. In an aerial delivery system, a fuselage having an opening through the lower surface thereof, a closure for said opening, track means extending across said opening, load-carrying units in rolling engagement with said track means, flexible means having spaced engaging elements arranged to separately engage each said load-carrying unit, power means arranged to move said flexible means and said engaged load-carrying units along said track means, means interconnecting said closure with said power means arranged to initiate said power means upon said closure being moved to an opened position, trip means cooperatively associated with said load-carrying units and said track means initiated by each said load-carrying unit reaching a predetermined point along said track means for automatic release of its load through said opening, and means cooperatively associated with said trip means initiated by movement of each said load-carrying unit beyond said predetermined load-releasing position for disengaging each said load-carrying unit from said flexible means while maintaining said rolling engagement with said track means.

16. In an aircraft having a fuselage containing a cargo space defined at its lower portion by a floor, an opening through the central portion of said cargo space floor and a sustaining surface transversely disposed with respect to the longitudinal axis of said fuselage extending across and above said central floor opening in said cargo space floor, a cargo-carrying conveyor extending longitudinally through said fuselage in the upper portion of said cargo space beneath said sustaining surface and across said floor opening, fore and aft groups of cargo-carrying units carried by said conveyor at the forward and rear portions thereof fore and aft of said floor opening, means including a source of power and automatic reversing mechanism for successively moving the said fore and aft groups of cargo units in opposite directions along said conveyor toward said floor opening, and tripping means effective upon each said cargo-carrying unit of each said group reaching predetermined positions along said conveyor as said units approach said centrally disposed floor opening for automatically releasing each said cargo unit from its respective portion of said conveyor for successively dropping said cargo units through said floor opening during flight of the aircraft.

17. An aerial delivery system comprising a supporing rail, power-driven means including an endless cable coextensively disposed with respect to said supporting rail, a plurality of trolleys rollingly supported upon said supporting rail, protuberance elements spatially carried by said power-driven means for bearing against and moving said trolleys along said supporting rail, release mechanism on said trolleys arranged to releasably support and transport a plurality of loads along said supporting rail, trip means fixedly disposed with respect to said supporting rail arranged to be engaged by said release mechanism for actuating said release mechanism for the release of said loads from said trolleys as said trolleys are moved along said supporting rail by said power-driven means past a predetermined releasing point, and means for reversing the direction of said power-driven means upon said power-driven means reaching a predetermined position.

18. In an aerial delivery system, a supporting rail, a trolley mounted for movement along said rail, power-driven propelling means including a cable carrying a fixed protuberance thereon disposed adjacent said rail, engaging means cooperatively carried by said trolley and said propelling means engageable with said protuberance on said cable for the powered movement of said trolley along said rail, load-carrying means associated with said trolley, trip means cooperatively associated with said trolley and said rail arranged for the release of said load from said trolley load-carrying means upon said trolley being moved to a predetermined position by said power-driven propelling means along said supporting rail, and means including a limit switch engageable by said power-driven propelling means at a further predetermined position arranged to initiate reversal of said power-driven propelling means.

19. In an aerial delivery system, a supporting rail extending above a hatch opening, a power-driven closure for said opening, a trolley mounted for movement along said rail, power-driven propelling means disposed adjacent said rail, engaging means cooperatively carried by said trolley and said propelling means for the powered movement of said trolley along said rail, load-carrying means associated with said trolley, locking means for locking said trolley to said rail, trip means cooperatively associated with said trolley and said rail arranged for the release of said load from said trolley load-carrying means upon said trolley reaching a predetermined position upon said supporting rail, and means initiated by the opening of said closure for automatically releasing said locking means.

20. In aircraft, a fuselage, a cargo space within said fuselage, a cargo hatch in the floor of said cargo space within said fuselage, a closure for said cargo hatch, a load supporting and releasing system disposed within said cargo space including means for stowing a load in a position within said cargo space remote from said cargo hatch, propelling means including a power-driven flexible cable initiated by the opening of said closure for moving said load from its stowed position to a position above said cargo hatch, and automatic means for releasing said load at a predetermined position above said cargo hatch for its dropping therethrough during flight.

References Cited in the file of this patent
UNITED STATES PATENTS

| Number | Name | Date |
|---|---|---|
| 780,348 | Jackman | Jan. 17, 1905 |
| 793,333 | Weaver | June 27, 1905 |
| 1,335,283 | Graf et al. | Mar. 30, 1920 |
| 1,554,765 | Shaffer | Sept. 22, 1925 |
| 1,556,819 | Hires | Oct. 13, 1925 |
| 2,268,009 | Babb | Dec. 30, 1941 |
| 2,343,638 | Bock | Mar. 7, 1944 |
| 2,390,230 | Trusty | Dec. 4, 1945 |
| 2,404,195 | Schlieben | July 16, 1946 |

FOREIGN PATENTS

| Number | Country | Date |
|---|---|---|
| 129,329 | Great Britain | May 21, 1918 |
| 428,860 | Great Britain | May 7, 1935 |

OTHER REFERENCES

"Flight" of July 11, 1946, pp. 41, 42, 43.